(12) United States Patent
Ikram (10) Patent No.: US 9,083,783 B2
(45) Date of Patent: Jul. 14, 2015

(54) DETECTING DOUBLE TALK IN ACOUSTIC ECHO CANCELLATION USING ZERO-CROSSING RATE

(71) Applicant: Texas Instruments Incorporated, Dallas, TX (US)

(72) Inventor: Muhammad Zubair Ikram, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/091,346

(22) Filed: Nov. 27, 2013

(65) Prior Publication Data

US 2014/0146963 A1    May 29, 2014

Related U.S. Application Data

(60) Provisional application No. 61/730,995, filed on Nov. 29, 2012, provisional application No. 61/732,506, filed on Dec. 3, 2012.

(51) Int. Cl.
*H04M 9/08* (2006.01)
*H04B 3/23* (2006.01)
*H04M 3/00* (2006.01)

(52) U.S. Cl.
CPC ............... *H04M 9/082* (2013.01); *H04B 3/234* (2013.01); *H04M 3/002* (2013.01)

(58) Field of Classification Search
None
See application file for complete search history.

(56) References Cited

U.S. PATENT DOCUMENTS

| | | | | | |
|---|---|---|---|---|---|
| 5,970,447 | A | * | 10/1999 | Ireton | 704/233 |
| 6,735,303 | B1 | * | 5/2004 | Okuda | 379/406.04 |
| 6,765,971 | B1 | * | 7/2004 | Qin | 375/316 |
| 2004/0252827 | A1 | * | 12/2004 | Sasaki | 379/406.08 |
| 2010/0183140 | A1 | * | 7/2010 | Cheng et al. | 379/406.03 |
| 2011/0064242 | A1 | | 3/2011 | Parikh et al. | |
| 2013/0046535 | A1 | | 2/2013 | Parikh et al. | |
| 2013/0077776 | A1 | | 3/2013 | Ikram | |

OTHER PUBLICATIONS

Steven Gay and Jacob Benesty, "Acoustic Signal Processing forTelecommunciation", 2000, pp. 1-13, Kluwer Academic, Norwell, MA.
Muhammad Z. Ikram, "Blind Source Separation and Acoustic Echo Cancellation: A Unified Framework", 2012 IEEE International Conference on Acoustics, Speech and Signal Processing, Mar. 25-30, 2012, Kyoto, Japan, pp. 1701-1704.

(Continued)

*Primary Examiner* — Fan Tsang
*Assistant Examiner* — Jeffrey Lytle
(74) *Attorney, Agent, or Firm* — Mirna Abyad; Frank D. Cimino (57) ABSTRACT

A method for acoustic echo cancellation in a communication device is provided that includes receiving a first near-end audio signal in the communication device, wherein the first near-end audio signal comprises acoustic echo of a far-end audio signal reproduced by the communication device, and performing echo cancellation on the first near-end audio signal to generate a second near-end audio signal with at least some of the acoustic echo removed, wherein the echo cancellation is performed responsive to presence or absence of double-talk (DT), and wherein a zero-crossing rate (ZCR) is used to detect the presence or absence of DT.

12 Claims, 5 Drawing Sheets

(56) References Cited

OTHER PUBLICATIONS

Tomas Gansler et al, "Double-Talk Robust Fast Converging Algorithms for Network Echo Cancellation", IEEE Transactions on Speech and Audio Processing, vol. 8, No. 6, Nov. 2000, pp. 656-663.

Jacob Benesty et al, "A New Class of Doubletalk Detectors Based on Cross-Correlation", IEEE Transactions on Speech and Audio Processing, vol. 8, No. 2, Mar. 2000, pp. 168-172.

Kyu-Ho Lee et al, "Frequency-Domain Double-Talk Detection Based on the Gaussian Mixture Model", IEEE Signal Processing Letters, vol. 17, No. 5, May 2010, pp. 453-456.

Herbert Buchner et al, "Robust Extended Multidelay Filter and Double-Talk Detector for Acoustic Echo Cancellation", IEEE Transactions on Audio, Speech, and Language Processing, vol. 14, No. 5, Sep. 2006, pp. 1633-1644.

Christian Schuldt et al, "A Delay-Based Double-Talk Detector", IEEE Transactions on Audio, Speech, and Language Processing, vol. 20, No. 6, Aug. 2012, pp. 1725-1733.

Constantin Paleologu et al, "Double-Talk Robust VSS-NLMS Algorithm for Under-Modeling Acoustic Echo Cancellation", 2008 IEEE International Conference on Acoustics, Speech and Signal Processing, Las Vegas, Nevada, Mar. 31-Apr. 4, 2008, pp. 245-248.

Siow Yong Low et al, "A Spectral Silt Approach to Doubletalk Detection", IEEE Transactions on Audio, Speech, and Language Processing, vol. 20, No. 3, Mar. 2012, pp. 1074-1080.

Lawrence R. Rabiner and Ronald W. Schafer, "Theory and Applications of Digital Speech Processing", Prentice-Hall, Upper Saddle River, NJ, 2011, pp. 256-263.

Kazuhiko Ozeki and Tetsuo Umeda, "An Adaptive Filtering Algorithm Using an Orthogonal Projection to an Affine Subspace and Its Properties", Electronics and Communications in Japan, vol. 67-A, No. 5, 1984, pp. 19-27, translated from Denshi Tsushin Gakkai Ronbunshi, vol. 61-A, No. 2, Feb. 1984, pp. 126-132.

\* cited by examiner

DETECTING DOUBLE TALK IN ACOUSTIC ECHO CANCELLATION USING ZERO-CROSSING RATE

CROSS-REFERENCE TO RELATED APPLICATIONS

This application claims benefit of U.S. Provisional Patent Application Ser. No. 61/730,995 filed Nov. 29, 2012 and U.S. Provisional Patent Application Ser. No. 61/732,506 filed Dec. 3, 2012, both of which are incorporated herein by reference in its entirety.

BACKGROUND OF THE INVENTION

1. Field of the Invention

Embodiments of the present invention generally relate detecting double talk in acoustic echo cancellation using zero-crossing rate.

2. Description of the Related Art

The history of acoustic echo cancellation (AEC) dates back to 1960s. As discussed in S. Gay and J. Benesty, Eds., "Acoustic Signal Processing for Telecommunication," pp. 2-13, Kluwer Academic, Norwell, Mass., 2000, [Gay herein], a number of attractive techniques have been proposed to address various aspects of AEC. One of the primary issues in the forefront of AEC development is handling of double talk (DT). DT occurs when both near-end and far-end speakers talk at the same time. The adaptive filter in an AEC is typically designed to cancel only the far-end echo, and the presence of a near-end signal strongly influences the convergence of the filter. The DT may cause divergence of the adaptive filter, thus causing the far-end listener to hear an echo, which is annoying and undesirable. Thus, it is important to detect DT and control its impact as quickly as possible.

Several techniques have been proposed to detect DT and thus avoid filter divergence. DT detectors are an integral part of almost all commercially available echo cancellers. A review of classical DT detection methods can be found in T. Gänsler, et al., "Double-Talk Robust Fast Converging Algorithms for Network Echo Cancellation," IEEE Transactions on Speech and Audio Processing, Vol. 8, No. 6, pp. 656-663, November, 2000. Some techniques control DT by restricting the communication to only one way, i.e., half-duplex, which may not be suitable for many applications. In other techniques, a DT detector is used that freezes filter adaptation in the presence of DT. To benefit from frozen filter adaptation, the DT detector needs to correctly estimate the start and end of the near-end speech. Any misdetection may lead to echo leakage to the far end. Also, the echo cancellation may suffer if the echo path changes during the time the filter adaptation is frozen.

The detection of DT is challenging as known techniques require a large amount of data for computation of correlation measures to detect DT. Furthermore, to help ensure that DT is detected, the measures are computed for each audio sample. The detection of DT may, therefore, be too computationally expensive for implementation on low-resource processors executing AEC.

SUMMARY

Embodiments of the present invention relate to methods, apparatus, and computer readable media for detecting double talk in acoustic echo cancellation using zero-crossing rate. In one aspect, a method for acoustic echo cancellation in a communication device is provided that includes receiving a first near-end audio signal in the communication device, wherein the first near-end audio signal comprises acoustic echo of a far-end audio signal reproduced by the communication device, and performing echo cancellation on the first near-end audio signal to generate a second near-end audio signal with at least some of the acoustic echo removed, wherein the echo cancellation is performed responsive to presence or absence of double-talk (DT), and wherein a zero-crossing rate (ZCR) is used to detect the presence or absence of DT.

In one aspect, a method for acoustic echo cancellation in a communication device is provided that includes receiving a first near-end audio signal in the communication device, wherein the first near-end audio signal comprises acoustic echo of a far-end audio signal reproduced by the communication device, computing a first estimate of the acoustic echo in a sample of the first near-end audio signal by applying an adaptive filter using first coefficients to a sample of the far-end audio signal, subtracting the first estimate of the acoustic echo from the sample of the first near-end audio signal to generate a sample of a second near-end audio signal, detecting double-talk based on a zero-crossing rate (ZCR) of the second near-end audio signal, and outputting a sample of a third near-end audio signal responsive to the double-talk detection, wherein the sample of the third near-end audio signal is generated by computing a second estimate of the acoustic echo in the sample of the first near-end audio signal by applying an adaptive filter using second coefficients to the sample of the far-end audio signal, wherein the second coefficients are coefficients of the adaptive filter immediately prior to when a current double-talk period began, and subtracting the second estimate of the acoustic echo from the sample of the first near-end audio signal.

In one aspect, a communication device is provided that includes means for reproducing a far-end audio signal, and means for receiving a near-end audio signal comprising acoustic echo of the far-end audio signal, wherein the communication device is configured to perform echo cancellation on the first near-end audio signal to generate a second near-end audio signal with at least some of the acoustic echo removed, wherein the echo cancellation is performed responsive to presence or absence of double-talk (DT), and wherein a zero-crossing rate (ZCR) is used to detect the presence or absence of DT.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Figure 1:
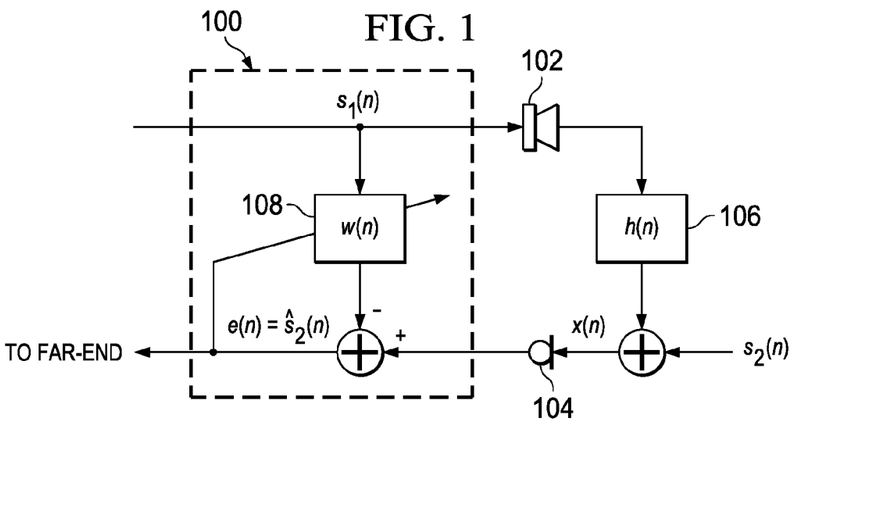
FIG. 1 is a block diagram of an example acoustic echo canceller (AEC) with no double-talk (DT) detection.

FIG. 1 is a block diagram of a near-end system implementing an acoustic echo canceller (AEC) 100 with no DT detection. In general, the AEC process operates as follows. An audio signal from a far-end system is delivered to the near-end system implementing the AEC and is reproduced by a loudspeaker. The received signal is filtered and delayed to resemble the near-end audio signal. The filtered signal is then subtracted from the near-end signal and the resulting near-end signal is sent to the far-end system.

In FIG. 1, the far-end and near-end audio signals are denoted by $s_1(n)$ and $s_2(n)$, respectively, where n denotes time. The filter h(n) 106 models the acoustic echo path from the loudspeaker 102 to the microphone 104, i.e., h(n) is a FIR filter 106 of length L, $$h(n) = [h^0(n), h^1(n), \ldots h^{L-1}(n)]^T$$

where the superscript of a filter coefficient denotes the tap index and $[\cdot]^T$ denotes transposition. The microphone 104 receives $x(n) = s_2(n) + (h(n)*s_1(n))$, where $h(n)*s_1(n)$ is the acoustic echo, * denotes convolution, and $s_2(n)$ is the sound wave from the environment surrounding the microphone 104, e.g., the voice of a speaker and ambient noise. Thus, x(n) includes both the near-end sound wave and the acoustic echo.

The adaptive echo cancellation filter w(n) 108 estimates the acoustic echo path h(n). The adaptive filter 108 is of length P and is denoted by $$w(n) = [w^0(n), w^1(n), \ldots w^{P-1}(n)]^T.$$

The adaptive filter is applied to the far-end audio signal $s_1(n)$ to estimate the acoustic echo in x(n), i.e., the echo is estimated as $w(n)*s_1(n)$. The output audio signal $\hat{s}_2(n)$ is generated by subtracting the acoustic echo estimate from x(n), i.e., $\hat{s}_2(n) = x(n) - (w(n)*s_1(n))$. Thus, if the two filters converge, i.e., w(n)=h(n), the entire acoustic echo in x(n) is cancelled such that $\hat{s}_2(n) = s_2(n)$.

Any of several well-known techniques may be used to update the coefficients of the adaptive filter w(n) 108. For simplicity of description, the well-known normalized least-mean squares (NLMS) technique is assumed. This technique is described, for example, in Gay. The adaptation may be expressed as $$w^k(n) = w^k(n-1) + \alpha \frac{e(n)s_1^*(n-k)}{\sum_{i=0}^{P-1}|s_1(n-i)|^2}$$ (Eq. 1)

for k=0 . . . P−1, where α is the adaptation constant, $(\cdot)^*$ denotes complex conjugation, and $e(n) = \hat{s}_2(n)$.

As previously mentioned, DT occurs when the far-end speaker and the near-end speaker talk simultaneously, i.e., $s_1(n) \neq 0$ and $s_2(n) \neq 0$. In such an event, there is a tendency for the adaptive filter to diverge, thus allowing at least some of the acoustic echo to remain. As is well-known, a DT detection component may be added to the AEC to help avoid the filter divergence. In general, a DT detector detects the presence of DT by comparing signal statistics against a threshold. Some of the more common forms of DT detectors are variants of the Geigel detector and detectors based on coherence (cross-correlation). Both types of detectors have been shown to be sensitive to variations in the echo path. In addition, cross-correlation based detectors can be computationally expensive.

Embodiments of the invention provide a low complexity, efficient technique for acoustic error cancellation with double-talk (DT) detection based on zero-crossing rate (ZCR) that is suitable for implementation on a low-power processor. The ZCR serves as a classifier for discriminating between the presence and absence of DT. As is explained in more detail herein, during the period that DT is present, the echo cancellation on the near-end audio signal to generate the output audio signal is performed using the filter coefficient values in place at the time DT was detected. When DT is not present, the echo cancellation on the near-end audio signal to generate the output audio signal is performed using the normally adapted filter coefficient values.

A zero crossing occurs in a digital signal when two consecutive samples in the signal have opposite signs. The ZCR for a window of M samples is computed as the number of zero crossings in the window divided by M. More specifically, at time n, the ZCR for a digital signal y(n) is given by $$ZCR(n) = \frac{1}{2M} \sum_{m=n-M+1}^{n} |\operatorname{sgn}(y(m)) - \operatorname{sgn}(y(m-1))| \omega(n-m)$$ (Eq. 2)

where sgn is defined as $$\operatorname{sgn}(y(n)) = \begin{cases} 1 & y(n) \geq 0 \\ -1 & y(n) < 0 \end{cases}$$

and ω(n) is a window function.

The value of |sgn(y(m))−sgn(y(m−1))| is 2 when a zero crossing occurs, i.e., when two consecutive samples have opposite signs. The summation is, therefore, divided by 2 to obtain the total number of zero crossings in the window and by M to obtain the ZCR for the window. It is well-known that high energy signals have a lower ZCR and low energy signal have a higher ZCR. The ZCR-based DT detection described herein exploits this property of ZCR to detect the occurrence of DT.

When DT occurs, the near-end signal $s_2(n)$ acts as disturbing noise to the adaptive filter that cancels the acoustic echo. As a result, the filter diverges and unwanted echo escapes to the far-end. Mathematically, the AEC output in the presence of DT is given by $$e(n) = [h(n) - w(n)]*s_1(n) + s_2(n)$$ (Eq. 3)

where * is the convolution operator. If no corrective action is taken to ameliorate the impact of DT, w(n)≠h(n), and the energy of the AEC output signal is high. Consequently, the ZCR of this output signal is low while the near-end speaker is talking.

Figure 2A:
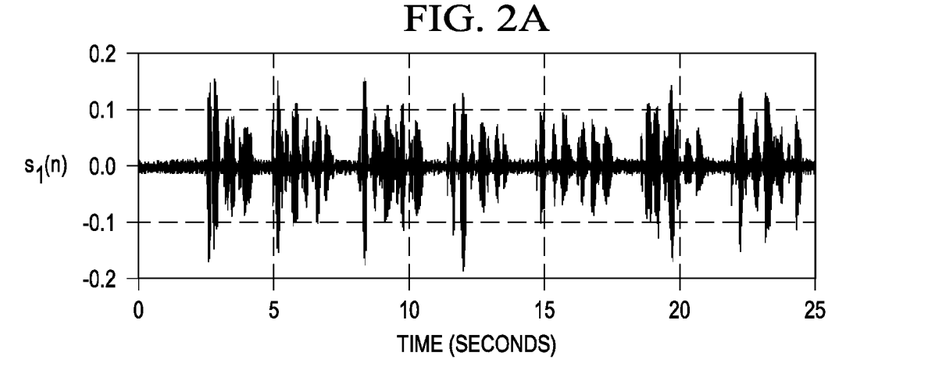
FIGS. 2A and 2B are graphs of, respectively, an example far-end speech signal and an example near-end speech signal with DT.
Figure 2B:
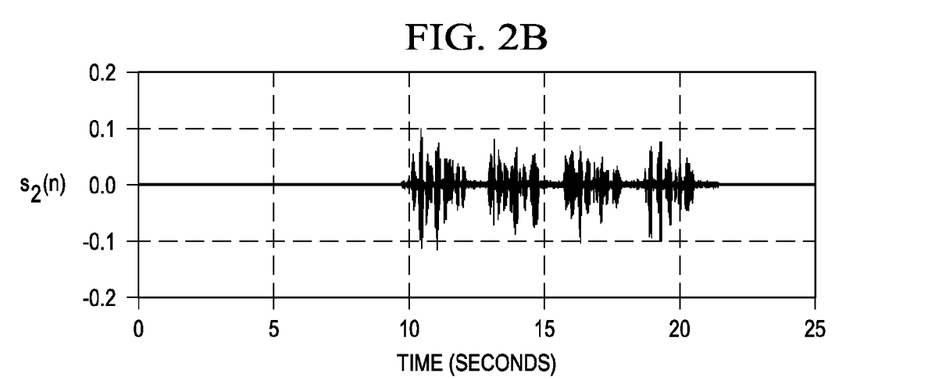

The basis for using ZCR to detect DT is now explained using an example of a conversation between a male speaker at the far-end system and a female speaker at the near-end system. FIG. 2A is a graph of the far-end speech signal, $s_1(n)$, and FIG. 2B is a graph of the near-end speech signal, $s_2(n)$. These graphs show that the far-end speaker talks for the first 10 seconds, followed by approximately 11 sec of DT in which both $s_1(n)\neq 0$ and $s_2(n)\neq 0$. The last four seconds of conversation talking by only the far-end speaker. In this example, the echo length is approximately 30 seconds and the average far-end signal to DT ratio is 5 dB.

Figure 3A:
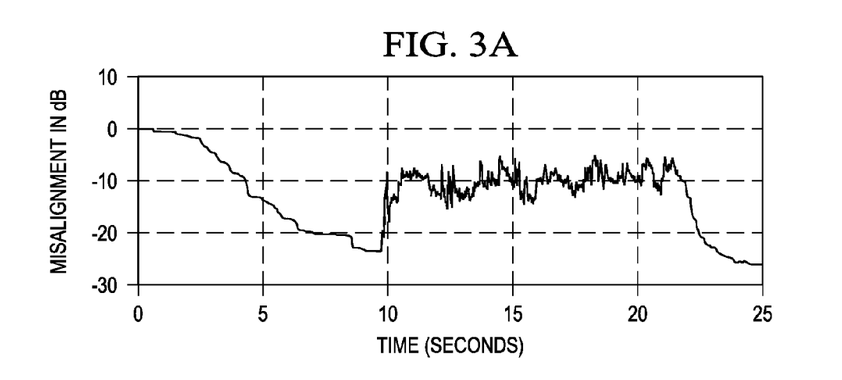
FIGS. 3A and 3B are graphs illustrating, respectively, the misalignment of the AEC adaptive filter of FIG. 1 when applied to the speech signals of FIGS. 2A and 2B and the zero-crossing rate (ZCR) at the output of the AEC of FIG. 1 when applied to the speech signals of FIGS. 2A and 2B.
Figure 3B:
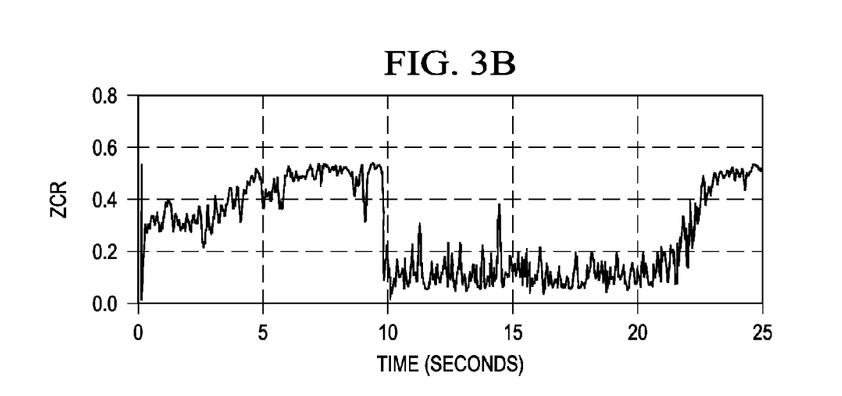

The adaptive filter misalignment caused by the DT is computed as $$20 \log 10 \frac{\|h - w\|}{\|h\|} \quad \text{(Eq. 4)}$$

where $\alpha=0.5$ in the computation of w (see Eq. 1). FIG. 3A is a graph illustrating the misalignment of the AEC adaptive filter caused by the period of DT. As can be seen from this graph, the filter diverged as soon as the near-end speaker started speaking and converged again when the near-end speech ended. FIG. 3B is a graph of the ZCR in the output signal of the AEC. As can be seen from this graph, the ZCR falls when the DT starts and stays low during the period the two speakers are talking simultaneously. In this example, the ZCR was computed for each output sample of the AEC over a rectangular window of M=1000 samples (which corresponds to 125 msec (milliseconds) at 8 kHz (kiloHertz).

Figure 4:
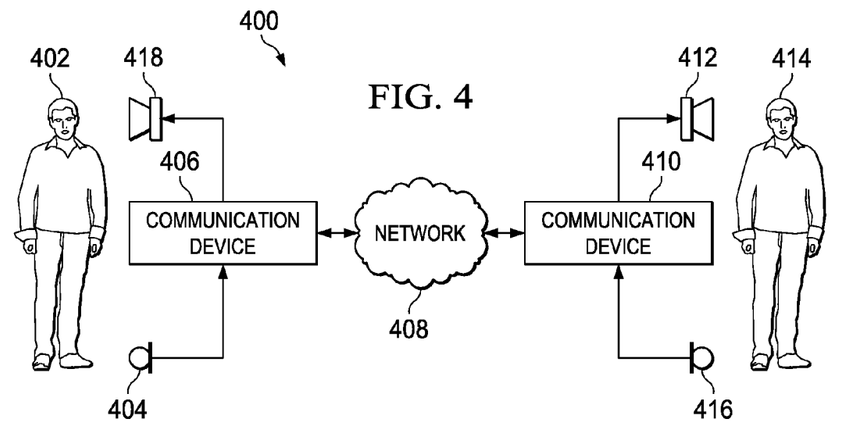
FIG. 4 is a block diagram of an example communication system.
Figure 5:
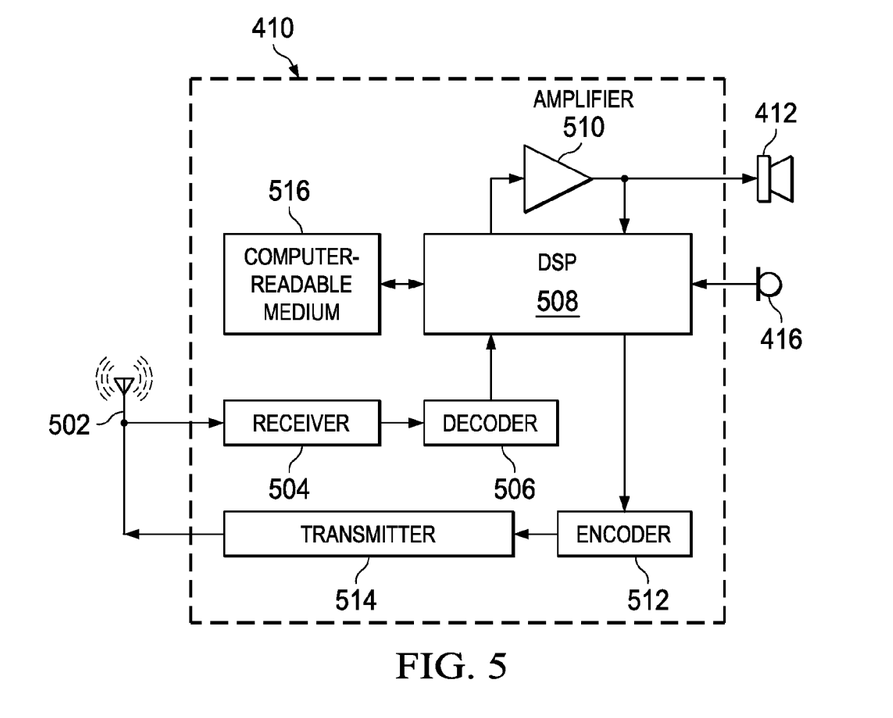
FIG. 5 is a block diagram of a communication device in the system of FIG. 4.

FIG. 4 is a block diagram of an example communication system 400 configured to use AEC with ZCR-based DT detection as described herein. FIG. 5 is a block diagram of the communication device 410, which is a representative one of the communication devices 406 and 410 of FIG. 4. FIG. 4 and FIG. 5 are described together. The microphone 404 is arranged to capture the voice of the user 402. The microphone 404 converts a sound wave of the environment around the microphone 404 into an audio (acoustic) signal. The sound wave may include the voice of the user 402 and ambient noise. In general, ambient noise is any sound in the environment other than the primary sound (in this case voice) being monitored, e.g., music, traffic, wind, etc. A communication device 406 receives the audio signal from the microphone 404, processes the signal to cancel at least some of any acoustic echo, encodes the signal, and outputs the encoded signal to a network 408 for delivery to another communication device 410. The network 408 may be any communication medium, or combination of communication media suitable for transmission of the encoded audio signal, such as, for example, wired or wireless communication media, a local area network, and/ or a wide area network. As is explained in more detail herein, the acoustic echo cancellation includes ZCR-based DT detection.

Referring now to FIGS. 4 and 5 together, a receiver 504 receives encoded audio signal from the communication device 406 via an antenna 502 and outputs the encoded signal to a decoder 506. The decoder 506 decodes the signal and provides the decoded signal to a digital signal processor (DSP) 508. The DSP 508 receives the decoded audio signal from the decoder 506 and processes the decoded signal to suppress at least some of the ambient noise captured from the environment around the microphone 404. After processing the audio signal, the DSP 508 causes an amplifier (AMP) 510 to output suitable electrical signals to a speaker 412 that are representative of the processed audio signal. In response to the electrical signals from the amplifier 510, the speaker 412 outputs an audible sound wave to a user 414. Accordingly, the user 414 hears the sound wave of the environment around the microphone 404, which may include the voice of the user 402, with at least some of the ambient noise in that sound wave removed.

The microphone 416 is arranged to capture the voice of the user 414. The microphone 416 converts a sound wave of the environment around the microphone 416 into an audio (acoustic) signal. The sound wave may include the voice of the user 414 and ambient noise. The DSP 508 receives the audio signal from the microphone 416, processes the signal to cancel at least some of any acoustic echo that may be present, and outputs the signal to an encoder 512. As is explained in more detail herein, the acoustic echo cancellation includes ZCR-based DT detection. The encoder 512 encodes the signal and provides the encode signal to a transmitter 514. The transmitter 514 outputs the encoded signal through the antenna 502 for transmission through the network 408 to the communication device 406.

The communication device 406 receives the encoded signal from the communication device 410, decodes the signal, and processes the decoded signal to suppress at least some of the ambient noise captured from the environment around the microphone 416. After the decoded audio signal is processed, suitable audio signals representative of the signal are output to the speaker 418, which outputs an audible sound wave to the user 402. Accordingly, the user 402 hears the sound wave of the environment around the microphone 416, which may include the voice of the user 414, with at least some of the ambient noise in that sound wave removed.

The DSP 508 receives and executes instructions of software programs that are stored on a computer-readable medium 516 (e.g., a nonvolatile memory device) of the communication device 410. These software instructions may implement all or part of the acoustic echo cancellation with ZCR-based DT detection performed on outgoing audio signals. In some embodiments, the representative communication device 410, the speaker 412, and the microphone 416 are embodied in a telephone. In some embodiments, the representative communication device 410, the speaker 412, and the microphone 416 are embodied in a digital system such as a laptop computer, a tablet computer, a desktop computer, etc.

Figure 6:
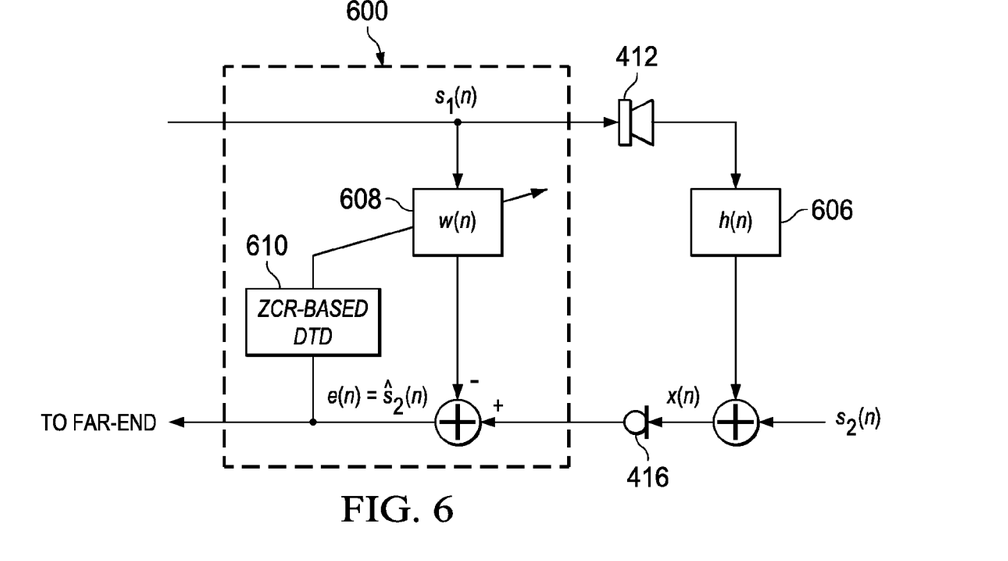
FIG. 6 is a block diagram of AEC configured to use ZCR-based DT detection.

FIG. 6 is a block diagram illustrating the data flow of an embodiment of the acoustic echo cancellation performed by the DSP 508 of FIG. 5. The audio signal from the communication device 406 (the far-end device) and the audio signal from the communication device 410 (the near-end device) are denoted by $s_1(n)$ and $s_2(n)$, respectively, where n denotes time. The filter h(n) 606 models the acoustic echo path from the loudspeaker 412 to the microphone 416 as previously described in reference to the filter h(n) 106 of FIG. 1. The microphone 416 receives $x(n)=s_2(n)+(h(n)*s_1(n))$, where $h(n)*s_1(n)$ is the acoustic echo, * denotes convolution, and $s_2(n)$ is the sound wave from the environment surrounding the microphone 416, e.g., the voice of the user 414 and ambient noise. Thus, x(n) includes both the near-end sound wave and the acoustic echo.

The adaptive echo cancellation filter w(n) 608 estimates the acoustic echo path h(n). The adaptive filter w(n) is the same as the previously described filter 108 of FIG. 1. The adaptive filter 608 is applied to the far-end audio signal $s_1(n)$ to estimate the acoustic echo in x(n), i.e., the echo is estimated as $w(n)*s_1(n)$. An echo-cancelled audio signal $\hat{s}_2(n)$ is generated by subtracting the acoustic echo estimate from x(n), i.e., $\hat{s}_2(n)=x(n)-(w(n)*s_1(n))$, and the coefficients of the filter are updated. Any of several well-known techniques may be used to update the coefficients of the adaptive filter w(n) 608. For simplicity of description, the well-known normalized least-mean squares (NLMS) technique is assumed. The adaptation may be expressed as per Eq. 1 above.

The ZCR-based DT detector (DTD) 610 is applied to the echo-cancelled audio signal $\hat{s}_2(n)$ to determine whether or not DT is present. To detect the presence of DT, the DTD 610 measures the ZCR of the echo-cancelled audio signal $\hat{s}_2(n)$ with a sample window of size M at each Kth sample. That is, the ZCR is computed over a window of M consecutive samples, and then the window is advance by K samples for the next ZCR computation. The DTD 610 may compute the ZCR as per Eq. 2 above. The computed ZCR is compared against a DT detection threshold $\gamma (0 \leq \gamma < 1)$. If the ZCR is above $\gamma$, DT is not present and the coefficients $\tilde{w}$ to be used to generate the echo-cancelled audio signal $\hat{s}_2(n)$ to be output for transmission to the communication device 406 are set to the current filter coefficients. If the ZCR falls below $\gamma$, DT is detected. During the time DT is detected, the coefficients $\tilde{w}$ are not updated. The echo-cancellation is repeated using the filter coefficients $\tilde{w}$ to generate the echo-cancelled audio signal to be transmitted to the communication device 406, i.e., $\hat{s}_2(n)=x(n)-(\tilde{w}*s_1(n))$ is computed to generate the signal for transmission.

TABLE 1

Compute $\hat{s}_2(n) = x(n) - (w(n) * s_1(n))$
Adapt coefficients w(n)
Compute ZCR
if ZCR > $\gamma$
  $\tilde{w} = w(n)$
Compute $\hat{s}_2(n) = x(n) - (\tilde{w} * s_1(n))$ The pseudo code in Table 1 illustrates the above-described operation of the AEC with the ZCR-based DTD at time n assuming K=1. Echo cancellation using the adapted filter coefficients is performed to generate an echo-cancelled near-end sample and the coefficients are updated are updated as per Eq. 1. ZCR is computed based on a sample window M that includes the echo-cancelled near-end sample. If the computed ZCR is greater than the threshold, the filter coefficients $\tilde{w}$ are set to the current filter coefficients. Otherwise, $\tilde{w}$ is not changed. Echo cancellation using the coefficients $\tilde{w}$ is then performed to generate the echo-cancelled near-end sample for transmission. Note that when the beginning of DT is detected at a time t, $\tilde{w}$ will be the coefficients computed at time t−1 and $\tilde{w}$ will not be changed until the end of the DT is detected. However, the coefficients w(n) will continue to be updated during the DT period.

Figure 7:
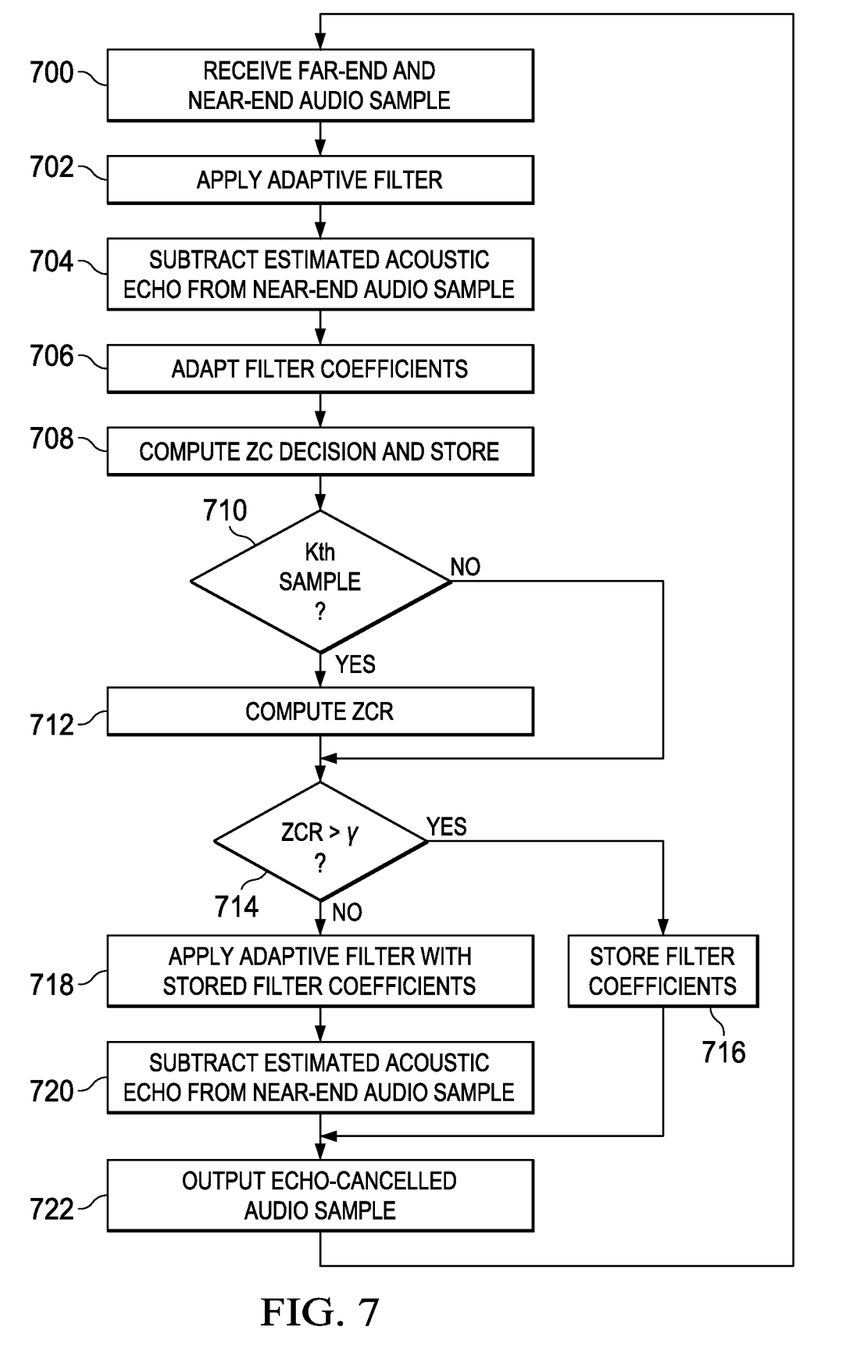
FIG. 7 is a flow diagram of a method for AEC using ZCR-based DT detection.

FIG. 7 is a flow diagram of a method for AEC with ZCR-based DT detection that may be performed by the DSP 508 of FIG. 5. As has been previously described, ZCR-based DT detection has three parameters, a ZCR computation sample window size M, a ZCR computation frequency interval K, and a DT detection threshold $\gamma$. In this method, a far-end audio sample and a near-end audio sample are received 700. An echo-cancelled near-end audio sample is generated by applying 702 the adaptive filter to the far-end sample using the adapted filter coefficients to estimate the acoustic echo in the near-end sample and subtracting 704 the estimated acoustic echo from the near-end sample.

The filter coefficients are then adapted 706. Any suitable technique for adaptation of the filter may be used. The previously described NLMS adaption technique is one example of a suitable technique. Another example of a suitable technique is the affine-projection adaptation technique. This latter technique is described in K. Ozeki and T. Umeda, "An Adaptive Filtering Algorithm Using an Orthogonal Projection to an Affine Subspace and Its Properties," Electronics and Communications in Japan, Vol. 67-A, No. 5, 1984, pp. 19-27, translated from Denshi Tsushin Gakkai Ronbunshi, Vol. 67-A, No. 2, February, 1984, pp. 126-132.

A zero crossing (ZC) decision for the echo-cancelled near-end sample is computed and stored 708. The ZC decision may be computed as $$|sgn(y(n)) - sgn(y(n-1))|$$

where sgn is defined as $$sgn(y(n)) = \begin{cases} 1 & y(n) \geq 0 \\ -1 & y(n) < 0. \end{cases}$$

The result of this computation is 2 when there is a zero crossing; otherwise, there is no zero crossing. An indication of the zero crossing decision for the sample may be stored in any suitable way. In some embodiments, a zero crossing decision is stored in a bit array of M bits, where a bit value of 1 indicates a zero crossing and a bit value of 0 indicates no zero crossing.

A check 710 is then performed to determine whether or not the ZCR should be computed. The value of the parameter K controls this test. As previously mentioned, ZCR is computed for every Kth sample. If the sample is the Kth sample since the last time ZCR was computed 710, then ZCR is computed 712 using the stored ZC decisions. Otherwise, ZCR is not computed. In embodiments in which the ZC decisions are stored as a bit array, ZCR may be computed by adding the bit values and dividing the sum by the window size M.

The current ZCR is compared 714 to the DT detection threshold $\gamma$ to determine whether or not DT is present. If the ZCR is higher than the threshold, then no DT is detected. Otherwise, DT is detected. If no DT is detected, the current filter coefficients are stored 716, the echo-cancelled near-end audio sample computed using these coefficients is output for transmission, and the AEC process begins again 700 for the next far-end and near-end audio samples. If DT is detected, echo cancellation is again performed on the near-end audio sample using the stored filter coefficients. That is, the adaptive filter is applied 718 to the far-end sample using the stored filter coefficients and the estimated acoustic echo is subtracted 720 from the near-end audio sample to generate an echo-cancelled near-end audio sample. This echo-cancelled near-end audio sample is output for transmission, and the AEC process begins again 700 for the next far-end and near-end audio samples.

The parameters M, K, and $\gamma$ of the ZCR-based DTD 610 of FIG. 6 and the method of FIG. 7 may have any suitable values and these values may be determined empirically. A shorter window length M provides less smoothing, which may result in incorrect DT decisions when the ZCR is close to the threshold. A longer window length M may better suppress incorrect decisions when ZCR is close to the threshold but may cause errors in locating the true start and/or end of DT regions. Experiments have shown that a window size of M=1000 samples (125 msec at 8 kHz) yields good performance. The parameter K determines how often the ZCR is updated. For optimal performance, K=1, so that the ZCR is update for each sample output by the AEC. However, computational resources consumed are reduced if K is larger than 1. The value of the threshold $\gamma$ controls the detection of DT. Experiments have shown that $\gamma$=0.45 to 0.5 is suitable for a window of size M=1000. The values of the parameters may be different depending on the expected audio input and/or the available computational resources.

Figure 8:
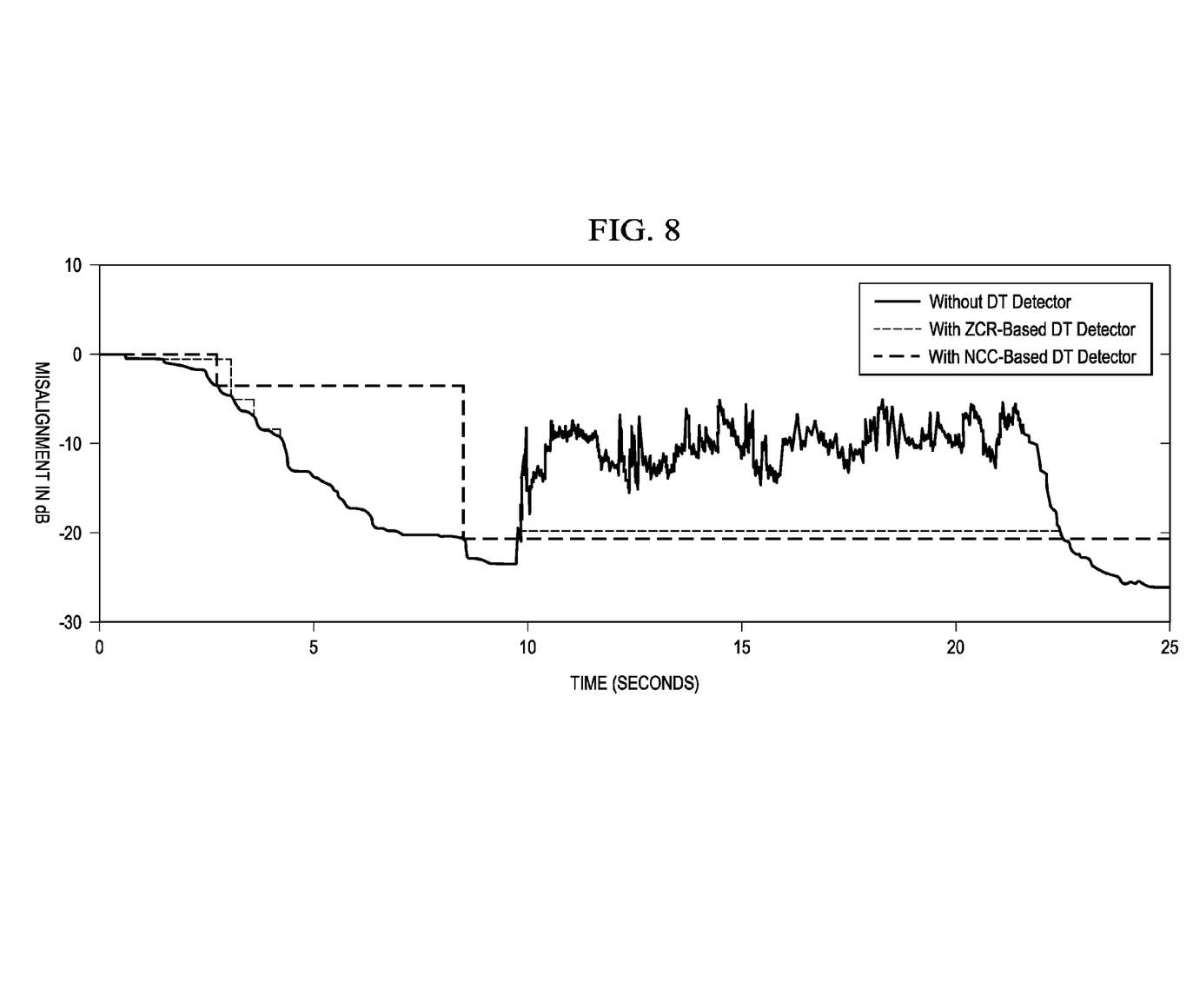
FIG. 8 is a graph comparing AEC output without a DT detector, using a ZCR-based DT detector, and using a normalized cross-correlation (NCC) based DT detector.

FIG. 8 is a graph comparing AEC filter misalignment when an NLMS-based AEC with no DT detection, with ZCR-based DT detection, and with normalized cross-correlation (NCC) based DT detection is applied to the far-end and near-end speech signals illustrated in FIGS. 2A and 2B. For the ZCR-based DT detection, M=1000, K=1, and γ=0.45 were used. For the NCC-based DT detection, a window size of 550 was used. As is illustrated in this graph, the ZCR-based DT detection detected DT at approximately 10 seconds when the near-end speech began (see FIG. 2B) and continued to detect DT until around 22 seconds, when the near-end speech ended. In contrast, the NCC-based DT detection erroneously detected DT beginning at 1 second, which stops the filter adaptation at that point. During the actual DT interval, the performance of the NCC-based DT detection and the ZCR-based DT detection is similar. However, the filter of the AEC with the ZCR-based DT detector continues to converge at the end of the DT period (at approximately 22 seconds) while the filter of the AEC with the NCC-based DT detection does not.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of AEC with ZCR-based DT detection described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for acoustic echo cancellation in a communication device, the method comprising:
receiving a first near-end audio signal in the communication device, wherein the first near-end audio signal comprises acoustic echo of a far-end audio signal reproduced by the communication device; and
performing echo cancellation on the first near-end audio signal to generate a second near-end audio signal with at least some of the acoustic echo removed, wherein the echo cancellation is performed responsive to presence or absence of double-talk (DT), and wherein a single zero-crossing rate (ZCR), computed at the output of the echo canceller, is used to detect the presence or absence of DT.

2. The method of claim 1, wherein performing echo cancellation comprises:
applying an adaptive filter to the far-end audio signal to estimate the acoustic echo in the near-end audio signal, wherein current filter coefficients are used when the ZCR indicates the absence of DT and coefficients of the adaptive filter when current DT was initially detected are used when the ZCR indicates the presence of DT; and
subtracting the estimated acoustic echo from the first near-end audio signal to generate the second near-end audio signal.

3. The method of claim 1, wherein the ZCR is computed over a window of samples of size M in an echo-cancelled near-end audio signal and is computed for every Kth sample in the echo-cancelled near-end audio signal, wherein M and K are integers, and wherein the echo-cancelled near-end audio signal is generated by applying an adaptive filter to the far-end audio signal to estimate the acoustic echo in the first near-end audio signal and subtracting the estimated acoustic echo from the first near-end audio signal, wherein coefficients used by the filter are updated each time a sample of the echo-cancelled near-end audio signal is generated.

4. The method of claim 3, wherein M=1000 and K=1.

5. A method for acoustic echo cancellation in a communication device, the method comprising:
receiving a first near-end audio signal in the communication device, wherein the first near-end audio signal comprises acoustic echo of a far-end audio signal reproduced by the communication device;
computing a first estimate of the acoustic echo in a sample of the first near-end audio signal by applying an adaptive filter using first coefficients to a sample of the far-end audio signal;
subtracting the first estimate of the acoustic echo from the sample of the first near-end audio signal to generate a sample of a second near-end audio signal;
detecting double-talk based on a single zero-crossing rate (ZCR) of the second near-end audio signal, wherein the single zero-crossing rate is computed at the output of the echo canceller; and
outputting a sample of a third near-end audio signal responsive to the double-talk detection, wherein the sample of the third near-end audio signal is generated by
computing a second estimate of the acoustic echo in the sample of the first near-end audio signal by applying an adaptive filter using second coefficients to the sample of the far-end audio signal, wherein the second coefficients are coefficients of the adaptive filter immediately prior to when a current double-talk period began; and
subtracting the second estimate of the acoustic echo from the sample of the first near-end audio signal.

6. The method of claim 5, further comprising:
computing the ZCR over a window of samples of size M in the second near-end audio signal, wherein M is an integer.

7. The method of claim 6, wherein the ZCR is computed for each Kth sample in the near-end audio signal, where K is an integer.

8. The method of claim 7, wherein M=1000 and K=1.

9. A communication device comprising:
means for reproducing a far-end audio signal; and
means for receiving a near-end audio signal comprising acoustic echo of the far-end audio signal;
wherein the communication device is configured to perform echo cancellation on the first near-end audio signal to generate a second near-end audio signal with at least some of the acoustic echo removed,
wherein the echo cancellation is performed responsive to presence or absence of double-talk (DT), and wherein a single zero-crossing rate (ZCR), computed at the at the output of the echo canceller, is used to detect the presence or absence of DT.

10. The communication device of claim 9, wherein the echo cancellation is performed by:
applying an adaptive filter to the far-end audio signal to estimate the acoustic echo in the near-end audio signal, wherein current filter coefficients are used when the ZCR indicates the absence of DT and coefficients of the adaptive filter when current DT was initially detected are used when the ZCR indicates the presence of DT; and
subtracting the estimated acoustic echo from the first near-end audio signal to generate the second near-end audio signal.

11. The communication device of claim 10, wherein the ZCR is computed over a window of samples of size M in an echo-cancelled near-end audio signal and is computed for every Kth sample in the echo-cancelled near-end audio signal, wherein M and K are integers, and wherein the echo-cancelled near-end audio signal is generated by applying an adaptive filter to the far-end audio signal to estimate the acoustic echo in the first near-end audio signal and subtracting the estimated acoustic echo from the first near-end audio signal, wherein coefficients used by the filter are updated each time a sample of the echo-cancelled near-end audio signal is generated.

12. The communication device of claim 11, wherein M=1000 and K=1.

* * * * *